(12) United States Patent
Stochosky

(10) Patent No.: US 8,001,187 B2
(45) Date of Patent: Aug. 16, 2011

(54) PEER-TO-PEER ACTIVE CONTENT SHARING

(75) Inventor: Michael Stochosky, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1403 days.

(21) Appl. No.: 10/612,632

(22) Filed: Jul. 1, 2003

(65) Prior Publication Data
US 2005/0004995 A1 Jan. 6, 2005

(51) Int. Cl.
*G06F 15/16* (2006.01)

(52) U.S. Cl. ........................................ 709/205

(58) Field of Classification Search .......... 709/203–207, 709/224; 715/753, 758, 716
See application file for complete search history.

(56) References Cited

U.S. PATENT DOCUMENTS

| | | | | |
|---|---|---|---|---|
| 6,161,132 A * | 12/2000 | Roberts et al. | ................ | 709/219 |
| 6,385,596 B1 * | 5/2002 | Wiser et al. | ...................... | 705/51 |
| 6,519,639 B1 * | 2/2003 | Glasser et al. | ................ | 709/224 |
| 6,583,806 B2 | 6/2003 | Ludwig et al. | | |
| 6,629,082 B1 * | 9/2003 | Hambrecht et al. | ........ | 705/36 R |
| 6,631,412 B1 * | 10/2003 | Glasser et al. | ................ | 709/224 |
| 6,697,840 B1 * | 2/2004 | Godefroid et al. | ............ | 709/205 |
| 6,754,904 B1 * | 6/2004 | Cooper et al. | ..................... | 725/32 |
| 6,757,732 B1 * | 6/2004 | Sollee et al. | ................ | 709/227 |
| 6,772,335 B2 * | 8/2004 | Curtis et al. | ................. | 713/163 |
| 6,865,599 B2 * | 3/2005 | Zhang | ........................... | 709/218 |
| 6,868,403 B1 * | 3/2005 | Wiser et al. | ..................... | 705/51 |
| 6,920,478 B2 * | 7/2005 | Mendiola et al. | ............. | 709/203 |
| 7,062,533 B2 * | 6/2006 | Brown et al. | ................ | 709/205 |
| 7,080,030 B2 * | 7/2006 | Eglen et al. | ..................... | 705/26 |
| 7,080,139 B1 * | 7/2006 | Briggs et al. | .................. | 709/224 |
| 7,124,164 B1 * | 10/2006 | Chemtob | ...................... | 709/204 |
| 7,152,093 B2 | 12/2006 | Ludwig et al. | | |
| 7,171,473 B1 * | 1/2007 | Eftis et al. | ..................... | 709/227 |
| 7,188,143 B2 * | 3/2007 | Szeto | ........................... | 709/206 |
| 7,203,294 B2 * | 4/2007 | Carnazza et al. | ........ | 379/142.07 |
| 7,206,809 B2 | 4/2007 | Ludwig et al. | | |

(Continued)

FOREIGN PATENT DOCUMENTS

WO   WO 03050659 A2 *  6/2003

OTHER PUBLICATIONS

Joe Wilcox, CNET, "Can Microsoft catch the teen spirit", Feb. 20, 2003.*

(Continued)

*Primary Examiner* — J Bret Dennison
(74) *Attorney, Agent, or Firm* — Williams, Morgan & Amerson, P.C.

(57) ABSTRACT

A system and method to allow chat modules in a peer network to share active content. A sender peer includes an application module to activate a media content file from a content repository. The sender peer also includes a chat module to detect active content on the common peer and send information about the active content for display at a recipient peer. The recipient peer includes a chat module to receive active content information and an application module to active the media in substantially synchronous to active media at the sender peer. A content enhancement server provides supplemental active content information for display at the recipient peer and previews of the active content. The content enhancement server also enables a transaction related to the active media content file such as a purchase of an MP3 copy of the active content.

44 Claims, 7 Drawing Sheets

U.S. PATENT DOCUMENTS

| | | | |
|---|---|---|---|
| 7,249,147 B2* | 7/2007 | Juszkiewicz | 707/104.1 |
| 7,263,497 B1* | 8/2007 | Wiser et al. | 705/26 |
| 7,386,798 B1* | 6/2008 | Heikes et al. | 715/752 |
| 7,412,470 B2 | 8/2008 | Masuno et al. | |
| 7,433,921 B2 | 10/2008 | Ludwig et al. | |
| 7,519,667 B1* | 4/2009 | Capps | 709/206 |
| 2002/0143944 A1* | 10/2002 | Traversat et al. | 709/225 |
| 2002/0147810 A1* | 10/2002 | Traversat et al. | 709/224 |
| 2002/0156893 A1* | 10/2002 | Pouyoul et al. | 709/225 |
| 2002/0169893 A1* | 11/2002 | Chen et al. | 709/248 |
| 2003/0041108 A1* | 2/2003 | Henrick et al. | 709/205 |
| 2003/0041141 A1* | 2/2003 | Abdelaziz et al. | 709/223 |
| 2003/0078969 A1* | 4/2003 | Sprague et al. | 709/204 |
| 2003/0105820 A1* | 6/2003 | Haims et al. | 709/205 |
| 2003/0208543 A1* | 11/2003 | Enete et al. | 709/206 |
| 2003/0225834 A1* | 12/2003 | Lee et al. | 709/204 |
| 2003/0225836 A1* | 12/2003 | Lee et al. | 709/205 |
| 2004/0003090 A1* | 1/2004 | Deeds | 709/227 |
| 2004/0019497 A1* | 1/2004 | Volk et al. | 705/1 |
| 2004/0039781 A1* | 2/2004 | LaVallee et al. | 709/205 |
| 2004/0054740 A1* | 3/2004 | Daigle et al. | 709/206 |
| 2004/0193680 A1* | 9/2004 | Gibbs et al. | 709/203 |
| 2004/0199514 A1* | 10/2004 | Rosenblatt et al. | 707/10 |
| 2004/0199663 A1 | 10/2004 | Horvitz et al. | |
| 2004/0205175 A1* | 10/2004 | Kammerer | 709/223 |
| 2004/0215731 A1* | 10/2004 | Tzann-en Szeto | 709/207 |
| 2004/0221299 A1* | 11/2004 | Gibbs et al. | 719/331 |
| 2004/0223485 A1* | 11/2004 | Arellano et al. | 370/351 |
| 2004/0230659 A1* | 11/2004 | Chase | 709/206 |
| 2004/0231003 A1* | 11/2004 | Cooper et al. | 725/135 |
| 2005/0005008 A1* | 1/2005 | Glasser et al. | 709/224 |
| 2005/0086311 A1* | 4/2005 | Enete et al. | 709/206 |
| 2005/0108392 A1* | 5/2005 | Glasser et al. | 709/224 |
| 2005/0188016 A1* | 8/2005 | Vdaygiri et al. | 709/205 |
| 2005/0192874 A1* | 9/2005 | Grear et al. | 705/30 |
| 2005/0193094 A1* | 9/2005 | Robbin et al. | 709/219 |
| 2006/0019702 A1* | 1/2006 | Anttila et al. | 455/556.1 |
| 2006/0168142 A1* | 7/2006 | Juszkiewicz | 709/219 |
| 2007/0097885 A1* | 5/2007 | Traversat et al. | 370/254 |
| 2007/0189489 A1* | 8/2007 | Carnazza et al. | 379/211.02 |
| 2008/0154967 A1* | 6/2008 | Heikes et al. | 707/104.1 |

OTHER PUBLICATIONS

Ant's Eye View, "Microsoft Aims at Youth With Threedegrees", Feb. 18, 2003.*

Micrsoft Computer Dictionary Fifth Edition, "definition of virtual device", 2002.*

Steven Levy, NEWSWEEK, "Microsoft gets a clue from its Kiddie Corps", Feb. 24, 2003.*

Safari Books Online, used to show publish date of "Microsoft Computer Dictionary, Fifth Edition" Jul. 1, 2008.*

International Search Report and Written Opinion, PCT/US04/21516, Apr. 8, 2005.

* cited by examiner

PEER-TO-PEER ACTIVE CONTENT SHARING

BACKGROUND OF THE INVENTION

1. Field of the Invention

This invention pertains to peer chat networks in general, and more particularly, to sharing active content and related information with another peer.

2. Description of Related Art

Instant messaging has recently emerged as a powerful communications model for both business and personal communications. Instant messaging software applications such as Apple Computer's iChat™, America Online's Instant Messenger™, Microsoft Corp.'s MSN Messenger™, and others allow users to communicate instantly with other users over a peer network. These applications permit users to track other users that are currently logged in and to send them real time text messages. Users typically maintain a contact or buddy list of preferred contacts that are friends, family, co-workers, or others having common interests, etc. The buddy list allows simple, albeit limited, access to the preferred contacts.

One problem with existing instant messaging applications is that they limit the real time information shared between a user and a contact to, for example, text messages, simple graphic files, and static file transfers. Significantly, current instant messaging applications do not allow users of a peer to directly and easily share information about active content on the peer. The instant messaging applications lack the software architecture to track active content in applications on a common peer, and lack the network communications architecture to share active content with other peers on the network.

Active content includes files that a user is currently accessing, such as music files the user is currently listening to, movies the user is currently watching, and other multimedia content the user is currently experiencing, or the like. Active files can also include other files that are open on the user's computer and in use by an application, such as a multimedia player like Apple Computer's iTunes™. Thus, if a user is listening to a music file on his computer, those contacts he may be currently instant messaging cannot hear that same file at the same time. Likewise, if the user were watching a movie, the instant messaging contacts would not be able to view the movie as well.

At best, in order to share such files, the sender must close the file (or make a copy of it), and then transfer the file via a file transfer function of the instant messaging application or as an attachment to an email sent by an email application, or a user can send a URL to a file if its available on the Internet. This process is not real time sharing of active content, but is essentially copying the static file (or a reference to it) from one computer to another. Further, neither approach provides the recipient with real time updates such as a change in active content, nor do they synchronize the recipient's version with the portion of the active content currently available to the sender, for example, the portion of a multimedia file being viewed by the sender. Moreover, many multimedia files are not well suited for emailing because of their large size.

Furthermore, there is no network architecture to automatically enhance the recipient's use of the user's active content information. Typically, a recipient of a static content file has to undertake additional manual steps to obtain such additional information. Again, if a user is listening to a music file, the user's instant messaging contacts, even those currently in a chat session, would not have direct access to information or meta-data such as the song's name, artist, album art, liner notes, or the like. More generally, there is no way for a one user of an instant messaging application to retrieve supplemental information about the active content in use on another user's computer from a database. Similarly, such instant messaging contacts of the user cannot today easily or directly purchase or preview a copy of active content within the instant messenger.

Another problem with existing messenger applications is that they are typically stand-alone applications that provide only messaging functionality. However, users often multitask between several applications on a single desktop, and typically have an instant messaging application running concurrently with other applications, such as word processors, spreadsheets, graphics applications, media applications, and the like. Thus, users must toggle between the instant messaging application to communicate with their contacts and other active applications to perform tasks such as playing back multimedia or surfing web sites, performing word processing, and the like.

Accordingly, there is a need to enhance application and network communication architecture of instant messengers to enable real time active content sharing. The solution should provide supplemental information, real time streaming or previewing, and enable a transaction for the recipient to obtain its own copy of the active content.

SUMMARY OF THE INVENTION

The present invention allows instant messaging applications in a peer network to share active content. A sender peer includes an application module to activate content from a file in a content repository. The application module may be a media player, a word processor, or other application for activating content. The active content is preferably a multimedia file, which may be incorporated in a word processing document, or other data file capable of execution in the application module. A chat module of the sender peer includes a daemon to track application modules and poll each application module for its current active content file, and its current display of the active content file. The chat module shares active content with a remotely located recipient peer through a network by sending active content information collected by the daemon, such as a unique identifier. The recipient peer includes a chat module to receive and output active content information, such as integrating the active content information into the chat module graphical user interface (GUI) display.

In one embodiment, a content enhancement server includes a content supplement database to provide supplements to shared active content to the recipient peer. Supplemental information can include descriptive information about the active content, meta-data, or additional information, such as name, creator, content descriptions, related files and so forth (e.g., a CD containing the active media, a graphic file of the artist, a preview, or transactional information to obtain a copy). In another embodiment, the content supplement database stores previews of active content for streaming to the recipient peer.

The content enhancement server may also include a content transaction module to enable a transaction based on the shared active content. The content enhancement server, for example, enables a purchase a copy of a shared music file. In another embodiment, the content transaction module serves as a gateway to third-party databases with available products by using application program interfaces to search the third-party databases and generate a list of available products.

In another embodiment of the system, the sender peer substantially synchronously streams active content to the recipient peer. The sender peer includes a server module and the recipient peer includes a client module that together negotiate streaming parameters for shared active content. The recipient peer's active content executing in the receiving application module correlates to the sender peer's active content executing in the sending application module.

Other embodiments include a method of active content sharing, a method of streaming shared active content, a method of enabling a transaction related to the active content, and a method of retrieving supplemental information about the active content.

DETAILED DESCRIPTION OF THE PREFERRED EMBODIMENTS

In the following description, for purposes of explanation, numerous specific details are set forth in order to provide a thorough understanding of the invention. The field of networking is such that many different variations of the illustrated and described features of the invention are possible. Those skilled in the art will undoubtedly appreciate that the invention can be practiced without some specific details described below, and indeed will see that many other variations and embodiments of the invention can be practiced while still satisfying the teachings of the invention. Further, those of skill in the art of networking appreciate the large variety of different networking protocols, topologies, transports, and the like that can be used to establish networked communications between computers. Accordingly, the present invention should not be understood as being limited to the specific example implementation described below.

Figure 1:
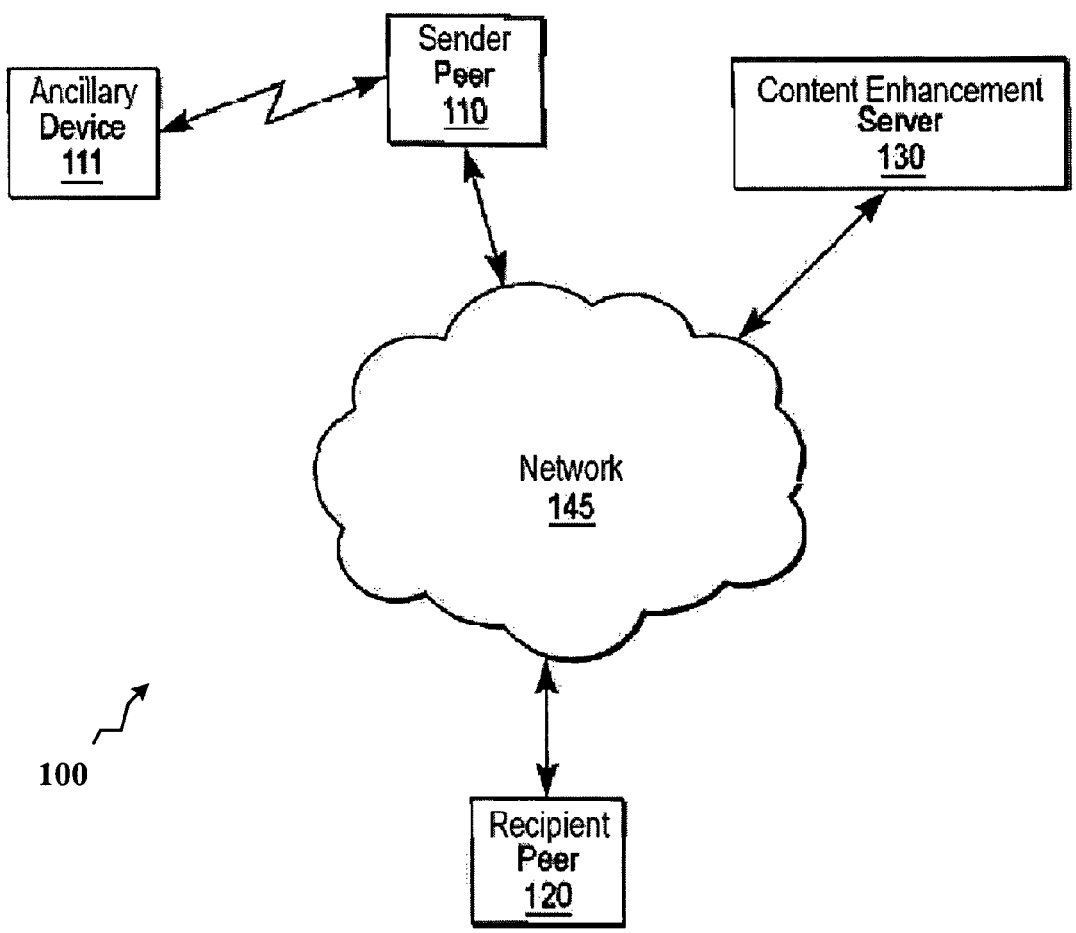
FIG. 1 is a block diagram of a system for sharing active content according to an embodiment of the present invention.

FIG. 1 is a block diagram of a system for sharing active content and related information between chat users. The system 100 includes a sender peer 110, a recipient peer 120, and a content enhancement server 130, each communicatively coupled to a network 145. Those of skill appreciate that the designation of a peer as sending or receiving is not fixed, and that in practice a peer is sometimes sending data and sometimes receiving data; that is, the designation of a peer as sending or receiving is merely for purposes of explanation and does not limit a peer to only that function.

Active content, as used herein, refers to a data file in current use at a peer. The data file in use may be media content such as an audio or video file being played back in a media player, text, graphics, or numeric content such as a document, spreadsheet, code file, graphics file, or any other file having data representing content that is capable of perception by a user at the peer. Shared active content refers to active content made available to other peers on the network by sending the peers active content information. Active content information may be meta-data about the data file (e.g., size, title, author, location, date, content list), an auxiliary data file related to the data file (e.g., unique identifier, associated graphics, text, references to other files), transaction information, or any other information directly or indirectly related to the content.

The sender peer 110 activates the content and sends active content information and synchronized active content streams to other peers on the network 145. In general, a peer is some type of computing device (physical or virtual), such as a computer, a telephone, set top box, a network appliance, or any device capable of connecting to the network 145 and receiving active content. As would be known to one of ordinary skill in the art, having the benefit of this disclosure, a sender peer 110 and/or a recipient peer 120 may comprise computer readable program storage devices. The sender peer 110 and/or a recipient peer 120, as would be known to one of ordinary skill in the art, having the benefit of this disclosure, may comprise computer readable program storage devices such as floppy disk drives, compact disc read-only memory (CD-ROM) devices, digital video disc (DVD) devices, universal serial bus (USB) storage devices, flash drives, tape drives, external storage devices, and/or the like, along with their respective media. In one embodiment, the sender peer 110 serves as a network gateway for an ancillary device 150 with active content that is wirelessly connected to the peer. For example, an MP3 player or a digital video recorder having active content may be networked to the peer, which in turn, shares the MP3 player's active content and related information with peers on the network 145. Further embodiments of the sender peer and methods operating therein are discussed below.

The recipient peer 120 receives and outputs active content information from other peers and the content enhancement server 130, and streamed active content. The recipient peer 120 may be any embodiment of the first peer, so output may be displayed in a GUI. However, in other embodiments, the second peer is a thin version of the first peer in that it has the capability to receive information about the active content, but not necessarily to activate a stream of the active content itself. For example, a telephone having the chat module (e.g., an SMS compatible text messaging module) may not have the multimedia player needed to activate streamed content. Further embodiments of the second peer and methods operating therein are discussed below.

The enhanced content server 130 provides supplemental information about active content information to the recipient peer 120, and enables related transactions. The enhanced content server 130 may be software, hardware, or a combination, residing on a network destination. The enhanced content server 130 may be part of a central peer server, or part of an independent third-party server compatible with the peer-to-peer protocol used by the peers in the system 100 such as iTunes Music Store. Further embodiments of the enhanced content server 130 and methods operating therein are discussed below.

In one example of the system 100, two users, one at the sender peer 110 and one at the recipient peer 120 exchange text messages through iChat, while the sender user also listens to an MP3 with iTunes. The receiver user notices active content information concerning the sender user's active media content (i.e., the MP3 in use) on the receiver user's iTunes and turns the conversation towards that song. The receiver user consequentially decides to preview the music, initiating a stream from the sender peer 110 to the recipient peer 120. Ultimately, the sender user purchases a copy from the iTunes Music Store.

The network 145 transports data packets containing information about active content information between, e.g., the sender peer 110, the recipient peer 120, and the enhanced content server 130. The network 145 may be a data network, a telephone network, or any other type of network capable of transporting data. The data may be video, audio, information, or otherwise. The network 145 can be public or private, including both wired and wireless portions, send data in packets or through circuits, and use communications protocols such as IP (Internet Protocol) or ATM (Asynchronous Transfer Mechanism). Combinations of the previous and variations of network communication are within the scope of the present invention since it is transport independent.

Examples of alternative embodiments of the system 100 include, an embodiment having more than two peers, an embodiment having peers without the auxiliary content server, and an embodiment having peers communicatively coupled through a first network 145 and one of the peers communicatively coupled to the auxiliary content server through a second network 145. In particular, FIG. 1 shows only two peers for illustration, but in actual practice, there will large number of peers.

Figure 2:
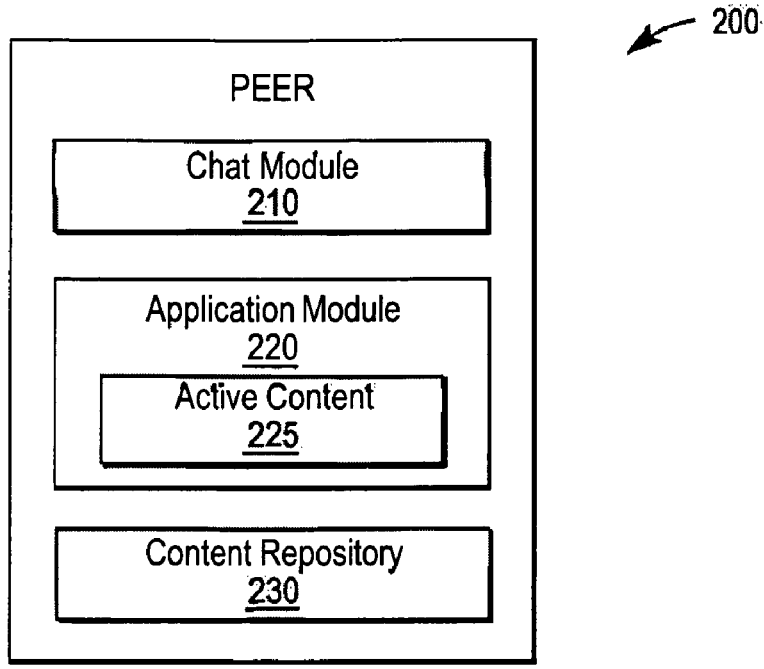
FIG. 2 illustrates a block diagram of a peer according to one embodiment of the present invention.

FIG. 2 illustrates a block diagram of the software architecture of a peer according to one embodiment of the present invention. The peer 200 includes a chat module 210, an application module 220, and a content repository 230. The hardware portions of a peer, e.g., storage devices, memory, microprocessor, buses, etc. are not illustrated, and can be of any conventional or equivalent design.

The chat module 210 sends and receives active content and related information. The chat module 210 connects to a centralized messenger service located on the network 145 to set-up communication with other peers. The centralized messenger service may be Apple Computer Inc.'s iChat™, America Online's AIM™, or the like. Peers can communicate with each other, with their messages passing through the messenger service, or directly with each other independently of the centralized messenger server. The chat module 210 may periodically communicate with the centralized messenger service to update communication with other peers such as setting-up connections with new peers and changing communication addresses of existing peers. Although the present embodiment utilizes a chat module 210 to share the active content, other embodiments may integrate active content sharing into different peer-to-peer communications modules such as an FTP module or other file sharing application.

Additionally, the chat module 210 may include a daemon to track and poll the application modules 220 to determine if there is active content. The chat module 210 also determines the real time output of active content. In other words, if a video file is playing back in a media player, the chat module 210 determines which video frame, point in time, or other location indicator is currently active in the application module 220. The chat module 210 sends active content and related information to other peers. In one embodiment, certain active content may be precluded from sharing according to parameters set by the user such as content containing confidential information.

The application module 220 further includes active content. The application module 220 may be application software, hardware, or a combination such as a media player, a word processor, or the like. To activate the data file, the application module 220 opens at least a portion of the data file and progresses through the data file either sequentially or otherwise. For example, a media player may load a portion of an audio file into a buffer representing the next ten seconds of audio playback. In another example, an e-book viewer may load an entire e-book file into a buffer to display portions of text in a window according to the window's size.

The content repository 230 stores data files that are activated by the application module 220. The content repository 230 may be a hard disk, flash memory, random access memory, or any device capable of non-volatile or volatile storage of data files. The data files contain data in any useful format, such .mpg, .wma, .omg, gif, .mp3, .doc, .txt, .pdf, or any format capable of execution by the application module 220. In one embodiment, the content repository 230 is networked to the sender peer 110 such as a personal digital assistant with data files connected to the peer via the Bluetooth wireless communications protocol.

Figure 3:
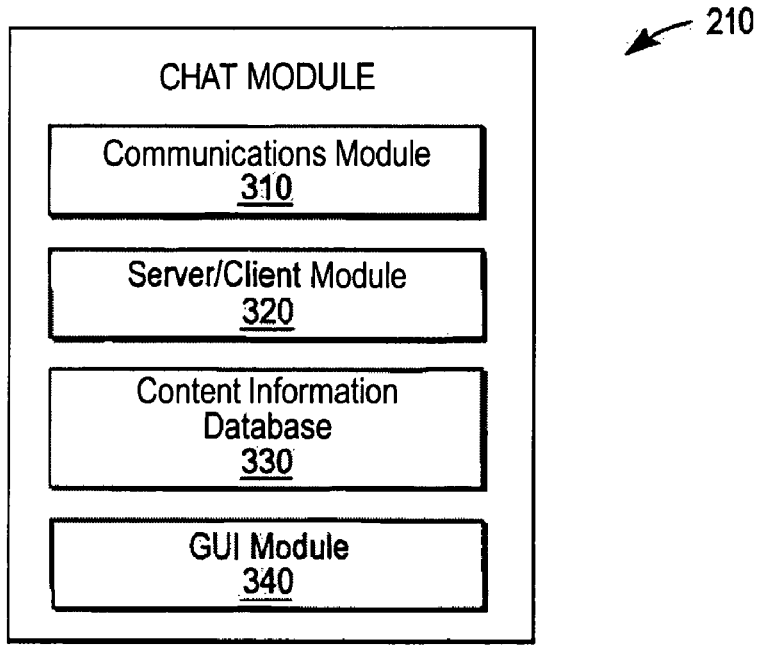
FIG. 3 illustrates a block diagram of a chat module according to an embodiment of the present invention.

FIG. 3 illustrates a block diagram of the chat module 210 according to an embodiment of the present invention. The chat module 210 comprises a communications module 310, a server/client module 320, a content information database 330, and a GUI module 340.

The communications module 310 provides a communications pathway for the chat module 210 to transmit messages, and to share active content through a peer-to-peer network. The communications module 310 logs-in to the centralized chat server and establishes point-to-point communication with other peers by exchanging network addresses such as IP addresses. The communications module 310 may further comprise a network interface, appropriate protocol stack, an operating system or port control, a peer network software, or and application software.

The server/client module 320 sends active content information for output at the other peers, and likewise receives active content information from other peers for local output. Additionally, the server/client module 320 performs synchronized data streaming of the active content. Synchronization, however, may be substantially synchronized since the operation is dependent on network load, streaming parameters, and other conditions. The server/client module 320 may be an FTP server, a desktop sharing server, an audio/video server, or any other device capable of sending and receiving active content through a network.

The content information database 330 stores information about active content shared with other peers. Active content information may be a meta-data about the data file such as its size, an auxiliary data file related to the data file such a unique identifier, related image file, content title, content source, or any other information directly or indirectly related to the content. The content information database 330 is queried with an identifier such as an MP3 ID tag received from, e.g., the chat module 210 or the application module 220. In response, the content information database 330 makes matching information available, such as the MP3 content title. The information can be displayed at the sender peer 110, sent to the recipient peer 120 for display, or sent to the content enhancement server 130.

In one embodiment, a unique identifier comprises an active content fingerprint such as a hash key or wavelet. The hash key can be determined from an algorithm implementing a mathematical transform on binary data such as SHA-1 or CRC32. The unique identifier may be used by the recipient peer 120 to retrieve locally stored active content information related to the file, or sent to the content enhancement server 130 to retrieve active content supplements.

The GUI module 340 provides a user interface of the chat module 210 and receives user commands related to active content. In the recipient peer 120, the GUI module 340 integrates the active content information into the chat module's 210 user interface as discussed below in regards to FIG. 4. The GUI module 340 receives user commands to, for instance, initiate a synchronized stream or initiate a transaction. The GUI module 340 may include a graphical engine, an audio/video CODEC, a processor, an operating system, graphic software, and other graphics enhancing devices.

Figure 4A:
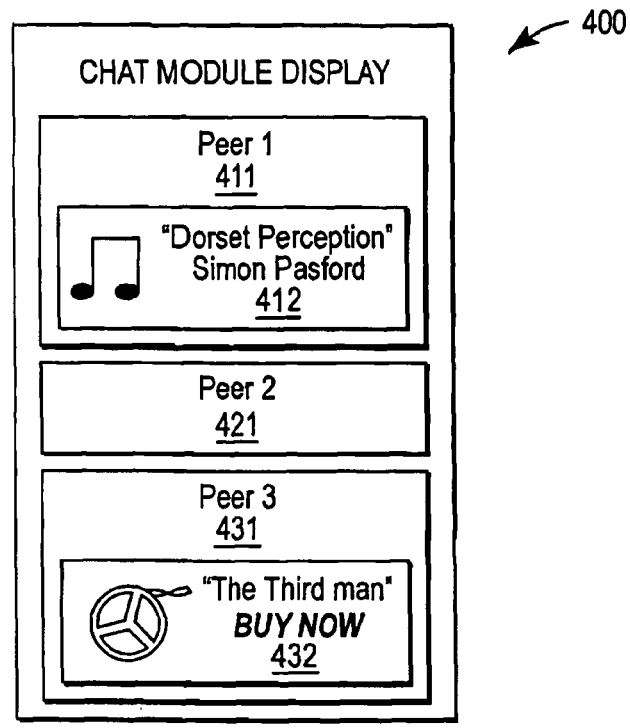
FIG. 4A is an illustration of a user interface displaying a recipient peer's chat module with integrated active content information.

FIG. 4A is an illustration of a user interface displaying a chat module with integrated active content information, as would be displayed on a peer. The chat module display 400 comprises contacts (e.g., 411), which are other peers on the network and, if there is any, each contact's active content information (e.g., 412). The contacts are a list of peers, which may be personal contacts, co-workers, or any other peers on the network 145.

The representation of Peer 1 includes information about active content 412 at Peer 1. Specifically, an icon indicates that the user of Peer 1 is listening to a song by Simon Posford titled "Dorset Perception." In response to selecting the icon, the chat module 210 initiates an active content stream as described below.

The representation of Peer 2 does not include information about active content at Peer 2. In one embodiment, Peer 2 does not send information about active content because, for example, there is no currently active content at Peer 2 or because Peer 2 has is not configured to share active content with the recipient peer 120. In another embodiment, the chat module 210 does not display received active content information because, for example, the recipient peer 120 is not capable of receiving an active content stream, or not capable of activating streamed content.

The representation of Peer 3 includes an icon indicating that the active content 432 at Peer 3 is a movie titled "The Third Man," and that this movie is available for purchase. In response to selecting the icon, the chat module 210 initiates a transaction as described below.

An advantage of this embodiment is that users of a peer can see real time active content information of other peers on the network, at least some of which, they may share an interest in the active information.

Figure 4B:
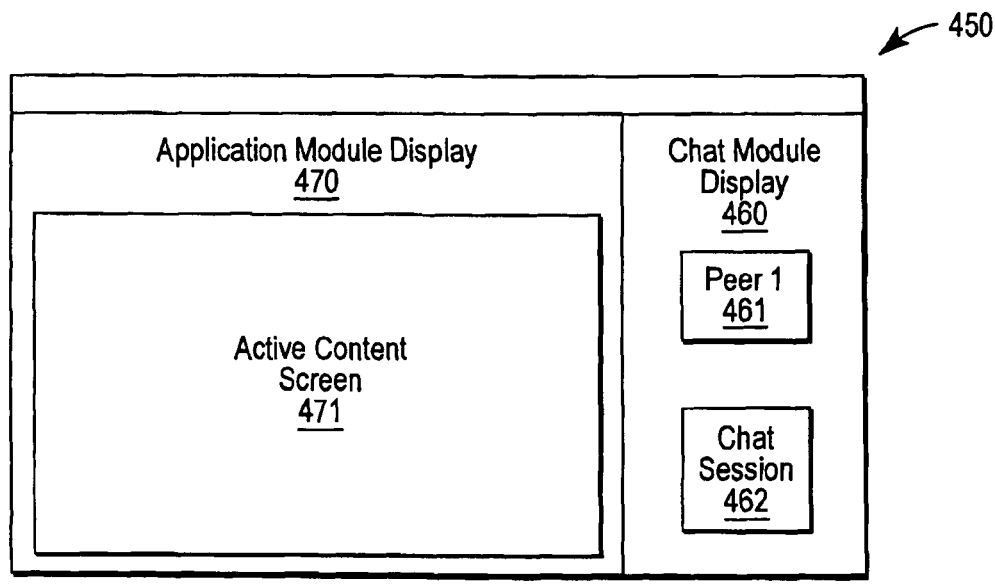
FIG. 4B is an illustration of a user interface displaying a recipient peer's application module with an integrated chat module.

FIG. 4B is an illustration of a user interface displaying a recipient peer's application module with an integrated chat module. The user interface includes an application module display 470 and a chat module display 460. The user interface may be rendered by a GUI to display in an application module 220.

The application module display 470 further includes an active content display 471 to output the content currently available to a peer. For example, the display can show active video content in response to that same content being displayed on the sender peer's 110 active content display.

The chat module display 460 further includes a representation of Peer 1 and a chat session 462. Peer 1 is preferably a peer having active content compatible with the application module 220. The chat session 462 is disposed within the user interface to allow access to messaging while viewing active content. Advantageously, the peer user need not toggle between application windows when messaging a peer about shared active content.

Figure 5:
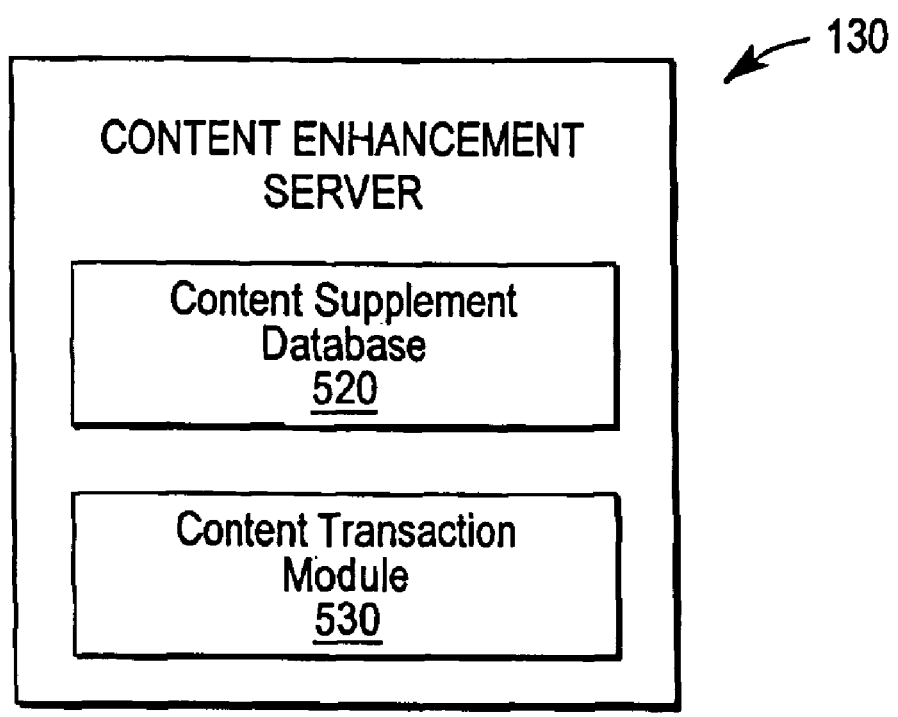
FIG. 5 is a block diagram illustrating a content enhancement server according to an embodiment of the present invention.

FIG. 5 is a sequence diagram illustrating a content enhancement server according to an embodiment of the present invention. The content enhancement server 130 includes a content supplement database 520, and a content transaction module 530.

The content supplement database 520 queries file descriptions to provide the recipient peer 120 with data files related to shared active content or active content that are stored in the content supplement database 520. The data files may be similar to the files stored in the content information database 330 and the content repository 230, or more loosely related to the shared active content such as data files of advertisements. Accordingly, a query for a music artist may return a new book about the artist or their latest CD. The query may use a unique identifier such as a hash key if available. In one embodiment, the content supplement database 520 streams the shared content for the sender peer 110, for example, to reduce the sender peer's 110 load or to control access to shared active content. One form of control is to allow previews of a predetermined time.

The content transaction module 530 facilitates transactions with the recipient peer 120 such as a purchasing active content. The content transaction module 530 includes a database of available products. The products identified by a tag received from the recipient peer 120. The content transaction module 530 receives an order for the product and stores a resulting transaction ticket.

In another embodiment, the content transaction module 530 enables transactions between the recipient peer 120 and third-party retailers. The content transaction module 530 sends queries to several third-party databases according to the third party's application program interface. Based on the results, the content transaction module 530 generates a list of products with hyperlinks to third-party web sites containing the products. The content transaction module 530 also stores each third-party web site impression and click-through from the hyperlink list.

Thus, the recipient peer 120 is able to automatically access supplemental information about shared active content and is easily able to obtain a copy of active content or a related product.

Figure 6:
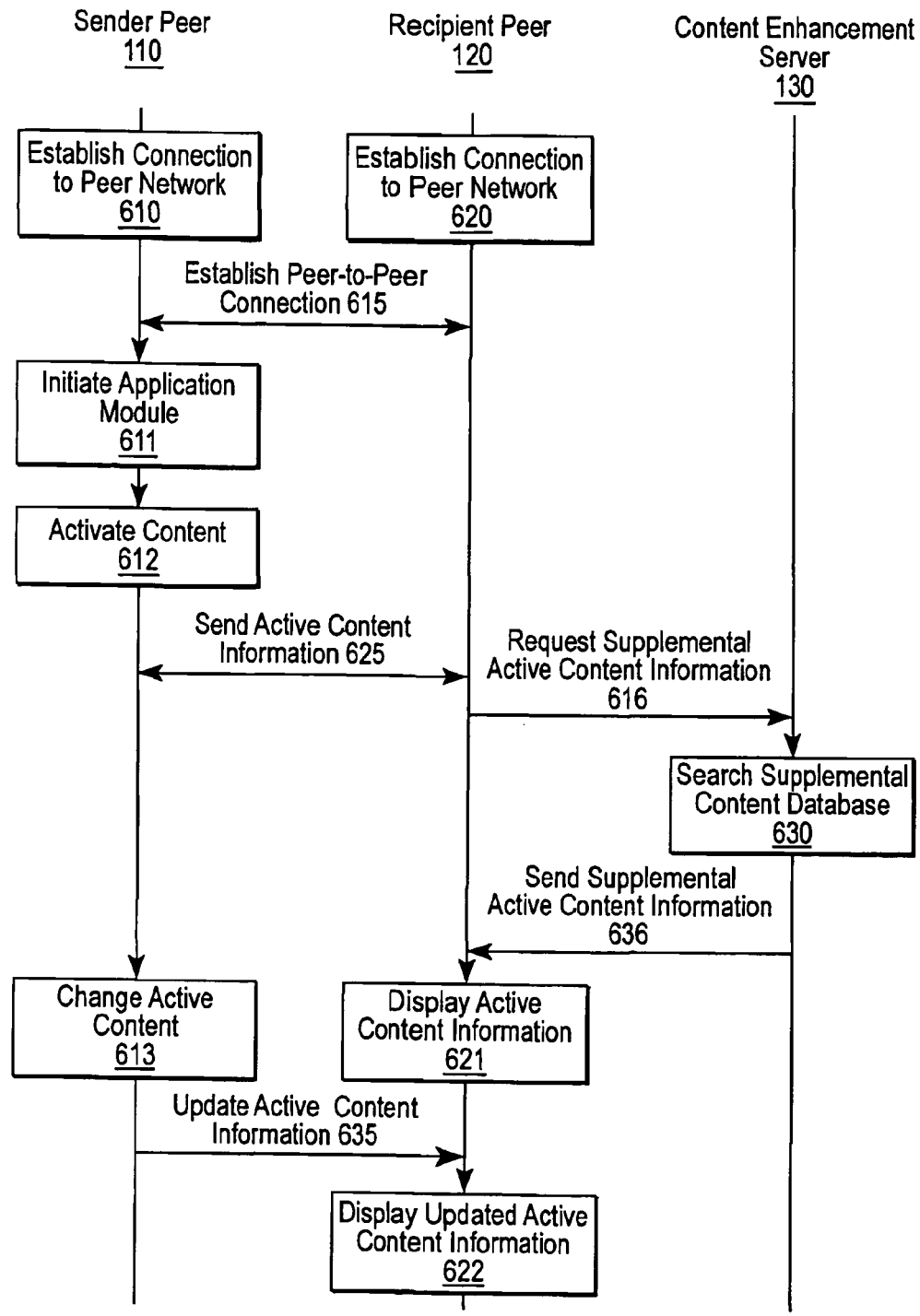
FIG. 6 is a sequence diagram illustrating a method of sharing active content in the system according to an embodiment of the present invention.

FIG. 6 is a sequence diagram illustrating a method of sharing active content in the system according to an embodiment of the present invention. The sending and recipient peers 110, 120 independently establish 610, 620 connections to the peer network by presenting an authorized log-in and password to a log-in server.

Next, the recipient and sender peers 110, 120 establish 615 a peer-to-peer connection to enable direct communication. Each peer sends a list of contacts or other parameter to the log-in server 510 for identifying preferred peers. The log-in 510 server returns a list of logged-in contacts with network addresses. The log-in server 510 also notifies other relevant peers that new peers have joined the network 145.

The sender peer 110 initiates 611 the application module 220. In one embodiment, the application module 220 and the chat module 210 are integrated into a single application, so both modules are initiated at the same time (e.g., FIG. 4B). The sending application module 220 activates 612 content from the content repository 230 by outputting a portion of the data file. The chat module 210 may have a daemon that detects the application module 220 running on the peer and periodically polls the application module 220 for active content information. In another embodiment, the application module 220 publishes its status to the daemon.

The sender peer 110 sends 625 active content information to the recipient peer 120 chat module 210. The recipient peer 120 may display or otherwise output the active content information, or request 616 supplemental information related to the active content from the content enhancement server 130. To check the content enhancement server 130, the recipient peer 120 sends an identifier such as a tag or title.

The content supplement database 520 searches 630 its files using a query based on the identifier for the shared active content. The query may be filtered by additional terms such as only pictures or only advertisements. If a unique identifier of the active content is available, such as a hash key, the query results are more determinative. Otherwise, the content supplement database 520 ranks the query results and sends 636 the supplemental active content information to the recipient peer 120 for display. In one embodiment, the content supplement database 520 saves peer-specific queries to use as parameters in future queries.

In another embodiment, the content supplement database 510 searches third party databases by sending a query using the application programming interface of the outside database. Based on matching the queries to database descriptions, the content enhancement database determines which databases to search. The content supplement database 510 ranks the results and generates a list of hyperlinks corresponding to third party websites containing the results. The content supplement database 510 may additionally store hyperlink impressions or click-throughs from the list.

The recipient peer 120 displays 621 the active content information in its user interface. In one embodiment, the recipient peer 120 may implement local preferences by running a local ranking of the received results or by filtering certain results. The peer may also elect to request a transaction from the with the content enhancement server 130 as discussed with respect to FIG. 7. The peer user may elect to request a stream of the shared active content from the sender peer 110 as discussed with respect to FIG. 8.

In response to the sender peer 110 changing 613 active content in the application module 220, the sender peer 110 sends 635 updated active content information to the recipient peer 120. The recipient peer 120 displays 622 updated active content information, or supplemental active content information in the chat module 210 user interface.

Figure 7:
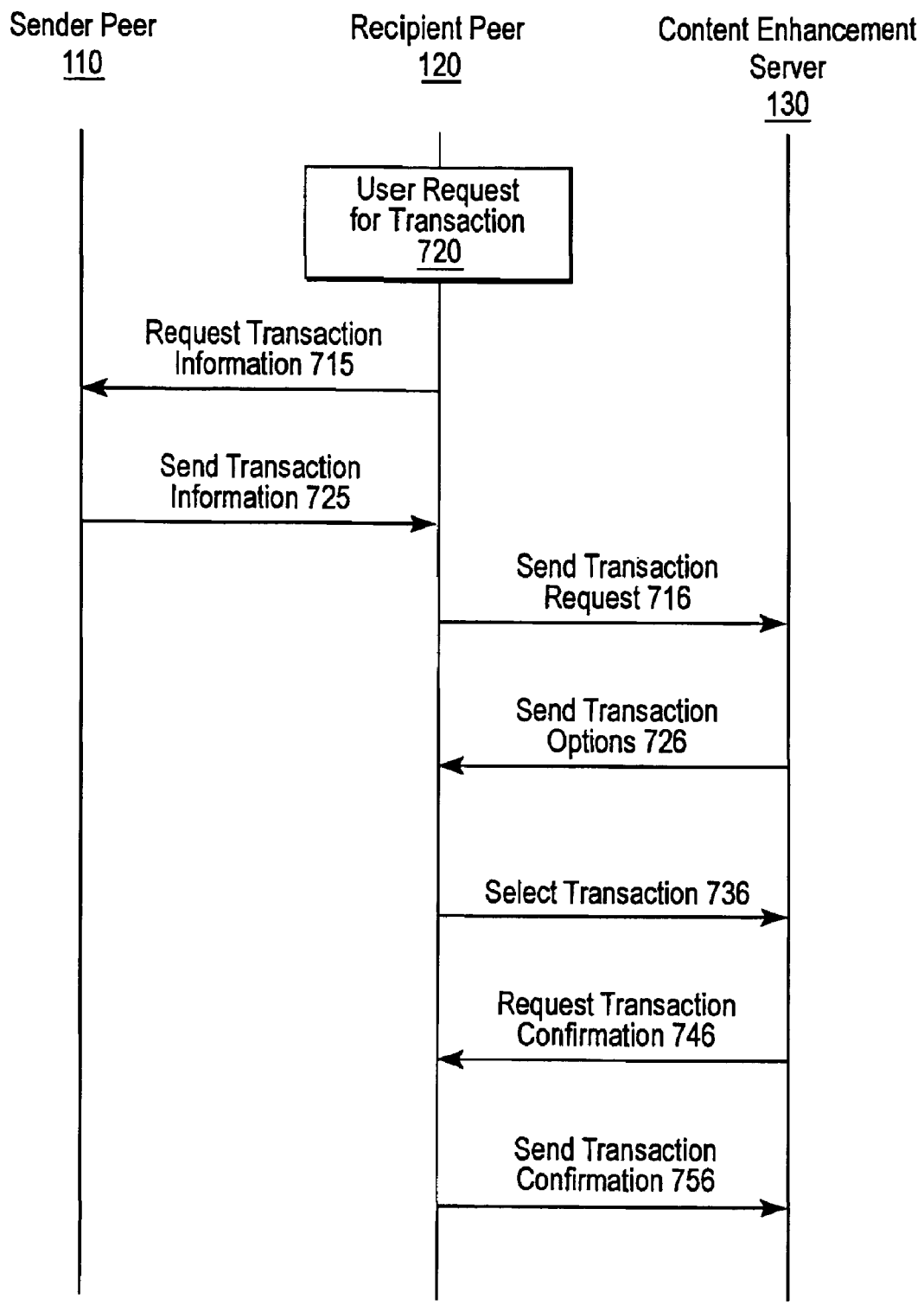
FIG. 7 is a sequence diagram illustrating a method of streaming active content between the sender peer and the recipient peer according to an embodiment of the present invention.

FIG. 7 is a sequence diagram illustrating a method of completing a transaction concerning shared active content according to an embodiment of the present invention. The recipient peer 120 sends 715 a request for transaction information to the sender peer 110 responsive to user input 720. Accordingly, the sender peer 110 sends 725 a transaction identifier such as the tag used to retrieve information from the supplemental content repository 230 or other shared active content information.

The recipient peer 120 sends 716 the identifier to the content enhancement server 130 to query a database in the content transaction database. In the example of a purchase transaction, the database query returns a opportunity to purchase, for example, an MP3 or CD containing a song or a DVD containing a movie. The database query may also send 726 related transaction options such as an option to purchase clothing designed by a queried music artist. The content transaction database ranks the query results and sends a list of transaction opportunities to the recipient peer 120 for display. The results may be displayed as hyperlinks or objects in a java applet.

The recipient peer 120 sends 736 a transaction selection such as a request to purchase a content source to the content transaction module 530 of the content enhancement server 130. In another embodiment, the content transaction module 530 requests further information from the recipient peer 120 user such as payment and shipping information.

Once the transaction terms are completed, the content transaction module 530 sends 746 a request for a transaction confirmation to the user. The transaction is completed when the recipient peer 120 sends 756 a transaction confirmation to the content transaction module 520.

Figure 8:
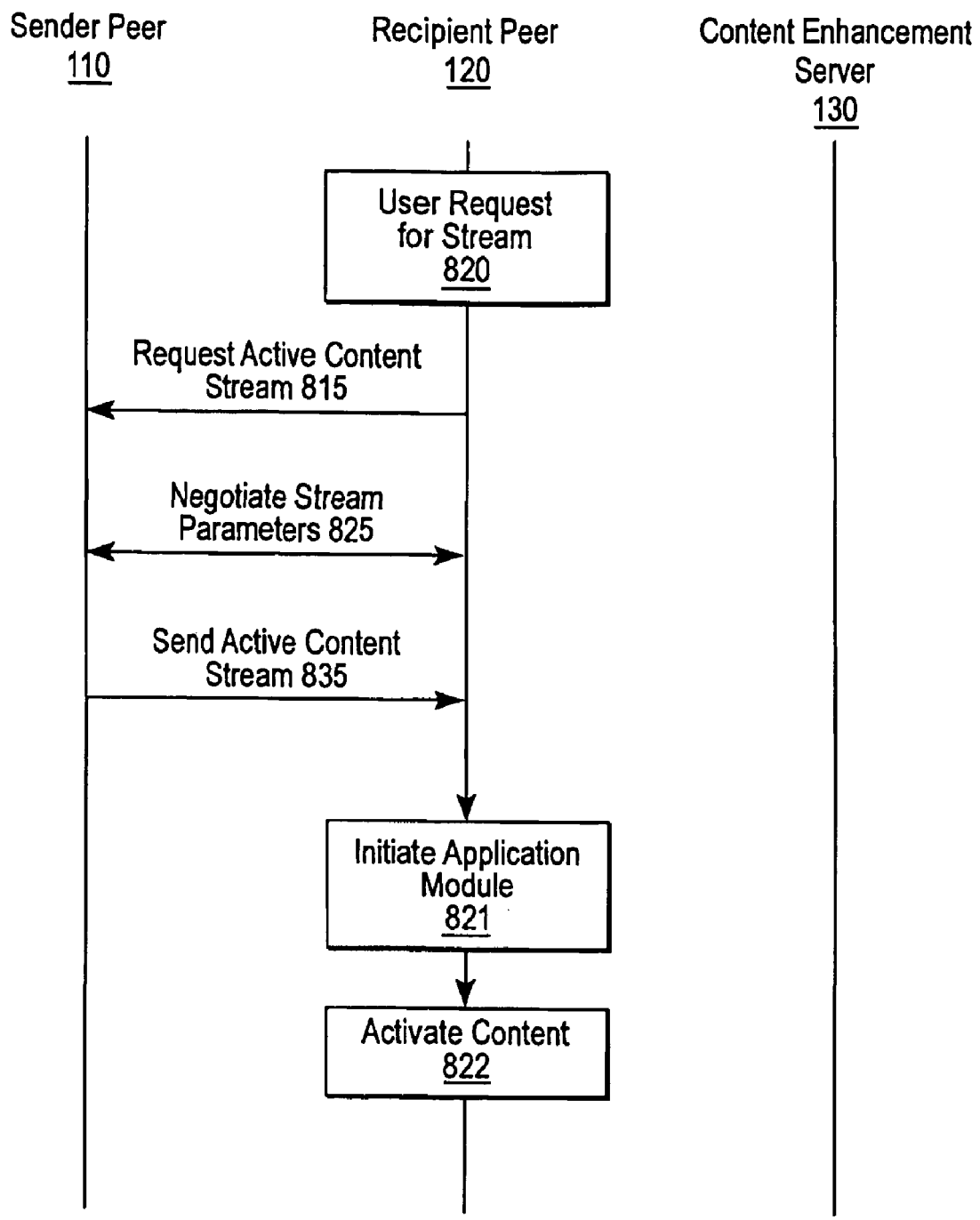
FIG. 8 is a sequence diagram illustrating a method of completing a transaction in the content enhancement server concerning shared active content according to an embodiment of the present invention.

FIG. 8 is a sequence diagram illustrating a method of streaming active content between the sender peer 110 and the recipient peer 120 according to an embodiment of the present invention. The recipient peer 120 sends 815 a request for a stream of shared active content to the sender peer 110 responsive to a user input 820 by the user of the recipient peer.

Next, the sender peer 110 and recipient peer 120 negotiate 825 stream parameters such as stream speed. Essentially, the sender peer's server/client module 320 and recipient peer's server/client module 320 provide a direct communication link by exchanging port numbers for the application modules 220. Additionally, the peers may assess local preferences, network 145 traffic load, and bandwidth requirements of the shared active content.

The server/client module 320 in the sender peer 110 synchronously streams the shared active content to the recipient peer 120. The recipient peer 120 determines which application modules 220 are compatible with the file type and initiates an application module 220. In one embodiment, if the file type is compatible with several application module 220s, the recipient peer 120 presents the user with a choice of application module 220s for activating the file.

The recipient peer 120 application module 220 activates the shared active content in the application module 220. The application module 220 may display or otherwise output the shared active content when a minimum amount of data has been received, buffer a certain amount of data, or wait until the entire file has been transferred.

The recipient peer 120 application module 220 sends shared active content information such as a change in display of the file, a change of shared active content, or termination of active content altogether.

In summary, the present invention allows the users of instant messenger to share active content with other users in the system 100, and to facilitate commerce. The chat module 210 uses a robust application and network communication architecture to share active content information with other peers in the system 100. Moreover, the sender peer 110 can send substantially synchronous streams or previews of active content to the recipient peer 120, which automatically activates the stream in a compatible application module 220. Furthermore, the content enhancement server 130 provides preview streams of active content, supplemental active content information, and enables transactions related to shared active content.

We claim:

1. A system for sharing an active content of a sender peer with a recipient peer, comprising:
   a hardware sender peer component comprising:
   a first hardware processor, that when programmed, is adapted to execute a first application module, for activating and outputting to activate and output active content from a data file and a first chat module, communicatively coupled to the first application module, the first chat module adapted to send the active content and at least one chat message using a chat module communications path;

a hardware recipient peer component comprising:

a second hardware processor, that when programmed, is adapted to execute a second chat module, communicatively coupled to the first chat module using the chat module communications path, for receiving and outputting the active content and the at least one chat message active on the sender peer; and a chat communications device in the chat module communications path, the chat communications device adapted to direct the sent active content and at least one chat message from the sender peer to the recipient peer.

2. The system of claim 1, wherein the second chat module further comprises a client module for requesting a stream of the active content and the first chat module further comprises a server module for sending the stream of active content in response to the request.

3. The system of claim 2, the recipient peer further comprises a second application module for automatically activating the active content stream.

4. The system of claim 3, wherein the stream is substantially synchronized with a portion of the active content currently active to the first application module.

5. The systems of claim 4, wherein the second application module allows active content playback control independent from the synchronized stream.

6. The system of claim 1, wherein the active content comprises a unique identifier.

7. The system of claim 6, wherein the recipient peer further comprises a content database, and the second chat module is configured to use the unique identifier to retrieve local active content from the content database.

8. The system of claim 6, wherein the recipient peer uses the unique identifier to retrieve active content from an active content enhancement server.

9. The system of claim 1, further comprising an active content enhancement server, communicatively coupled to the second chat module, for providing supplements related to the active content.

10. The system of claim 9, wherein the content enhancement server further comprises a content transaction module for processing a purchase related to one or more sources containing the active content.

11. The system of claim 9, wherein the active content enhancement server further comprises a content supplement database containing supplemental information related the active content.

12. The system of claim 9, further comprising a content repository containing previews related to the one or more sources containing the active content, and the active supplement database streams an active content preview to the recipient peer responsive to receiving a unique identifier.

13. The system of claim 9, wherein the sender peer and the recipient peer are communicatively coupled through a first network, and the recipient peer and the content enhancement server are communicatively coupled through a second network.

14. The system of claim 9, wherein the sender peer further comprises a content repository for storing content activated by the first application module.

15. The system of claim 9, wherein the first application module comprises a first media player, the second application module comprises a second media player, and a file format of the active content is compatible with the second application module.

16. The system of claim 15, wherein the active content comprises an active media.

17. The system of claim 16, wherein the active media comprises one the group consisting of an audio file and a video file.

18. The system of claim 1, wherein the active content comprises a title and a type of the active content.

19. The system of claim 1, wherein the first chat module is an instant messaging application.

20. The system of claim 1, wherein a display of the first chat module is integrated within a display of the first application module.

21. The system of claim 1, wherein the first chat module sends updated active content information to reflect a change of active content.

22. A method for sharing active content of a first peer with a second peer, comprising:

activating media content from a data file at a sender peer;

sending real time active media content from the sender peer to a recipient peer through a chat network connection responsive to detecting active media content on the sender peer, wherein the chat network connection is adapted to send at least one chat message, and wherein the chat network connection comprising a chat network device adapted to direct the active content between the first and second peers; and receiving and outputting the active media content at the recipient peer.

23. The method of claim 22, further comprising:

streaming the active media content from the sender peer to the recipient peer.

24. The method of claim 23, further comprising:

activating the active media content stream substantially in real time with the activated media content at the recipient peer.

25. The method of claim 22, further comprising:

retrieving supplemental information about the active media content by querying a content enhancement server.

26. The method of claim 25, wherein the supplemental information includes graphic files related to the active media.

27. The method of claim 22, further comprising:

sending transaction information related to the active media content to the recipient peer responsive to the recipient peer receiving the active media content; and processing a transaction related to the transaction information.

28. The method of claim 27, wherein the transaction is a purchase of the active media content.

29. The system of claim 22, wherein the activating comprises a first media player activating media content, and the receiving comprises a chat module receiving active media content.

30. The method of claim 22, wherein the active media content is an audio file.

31. The method of claim 22, wherein the active media content comprises a title and a type of the active media content.

32. The method of claim 22, further comprising:

updating active media content at the recipient peer responsive to a change of active media content at the sender peer.

33. A non-transitory, computer readable program storage device encoded with instructions that, when executed, perform a method for sharing an active content of a sender peer with a recipient peer, comprising:

activating content from a data file at the sender peer;

sending the active media content responsive to detecting active content from the sender peer, the sender peer adapted to send the active media content and at least one chat message using an pre-established communications path, wherein the pre-established communications path comprises a chat network device adapted to direct the active content between the sender and recipient peers; and receiving and outputting information about the active content at the recipient peer using the pre-established communications path.

34. The non-transitory, computer readable program storage device of claim 33, further comprising instructions and data for:

streaming the active content through the peer-to-peer network to the recipient peer.

35. The non-transitory, computer readable program storage device of claim 34, further comprising instructions and data for:

activating the active content stream at the sender peer.

36. The non-transitory, computer readable program storage device of claim 33, further comprising instructions and data for:

retrieving supplemental information about the active content by querying a content enhancement server with a unique identifier.

37. The non-transitory, computer readable program storage device of claim 33, further comprising instructions and data for:

sending transaction information related to the active content to the recipient peer responsive to the recipient peer receiving the active content; and processing a transaction related to the transaction information.

38. The non-transitory, computer readable program storage device of claim 37, wherein the transaction is a purchase of the active content.

39. The non-transitory, computer readable program storage device of claim 33, wherein activating comprises a first media player activating media content, and receiving comprises a chat module receiving active media content.

40. The non-transitory, computer readable program storage device of claim 33, wherein the active content comprises an active media content.

41. The non-transitory, computer readable program storage device of claim 33, further comprising instructions and data for:

updating active content at the recipient peer responsive to a change of active content at the sender peer.

42. A recipient chat module in a system for sharing active content between a plurality of peers, comprising:

a hardware processing device including a hardware processor, that when programmed, is adapted to execute a communications module for receiving a one or more unique identifiers based on shared active content on one or more sender peers, wherein receiving comprises receiving using a communications module communication path, a graphical user interface module for outputting one or more shared active content and receiving a selection of shared active content associated with one of the one or more sender peers, and a client module for sending a content stream request and receiving an active content stream, wherein receiving comprises receiving using the communications module communication path, wherein the recipient chat module is communicatively coupled to a chat communications device in the chat module communications path, the chat communications device adapted to direct the sent active content and at least one chat message from the sender peer to the recipient peer.

43. The recipient chat module of claim 42, wherein the content stream request comprises the unique identifier, and the recipient chat module sends the content stream request to a content enhancement server containing previews of the associated active content.

44. The recipient chat module of claim 42, further comprising an application module for activating the received active content stream.

* * * * *